June 30, 1970  M. J. LUGASH  3,517,838

POWER LOADER FOR VEHICLES WITH TRANSFER PLATE

Filed May 24, 1968  4 Sheets-Sheet 1

INVENTOR.
MAX J. LUGASH
BY Fulwider, Patton, Rieber
Lee, and Utecht
ATTORNEYS

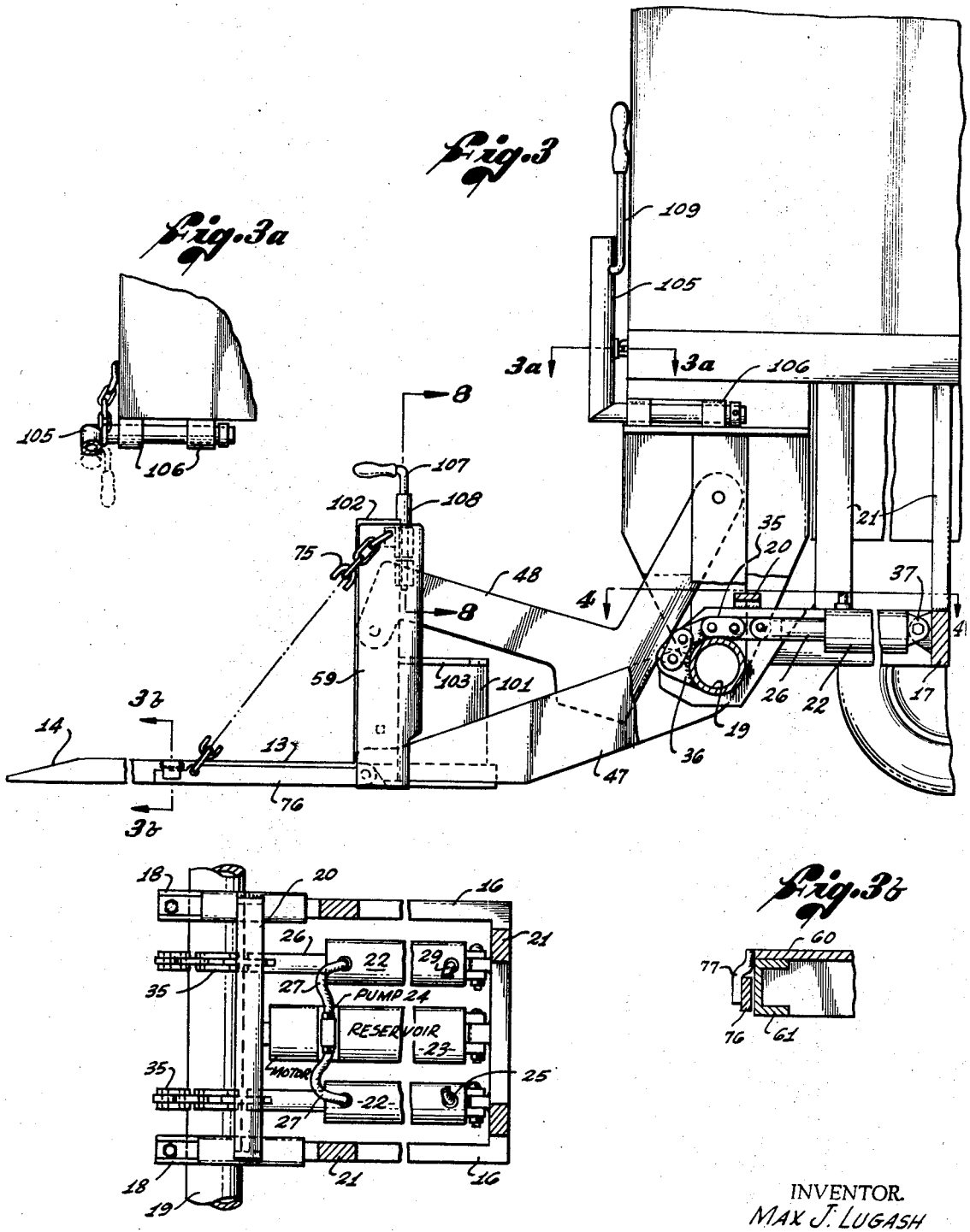

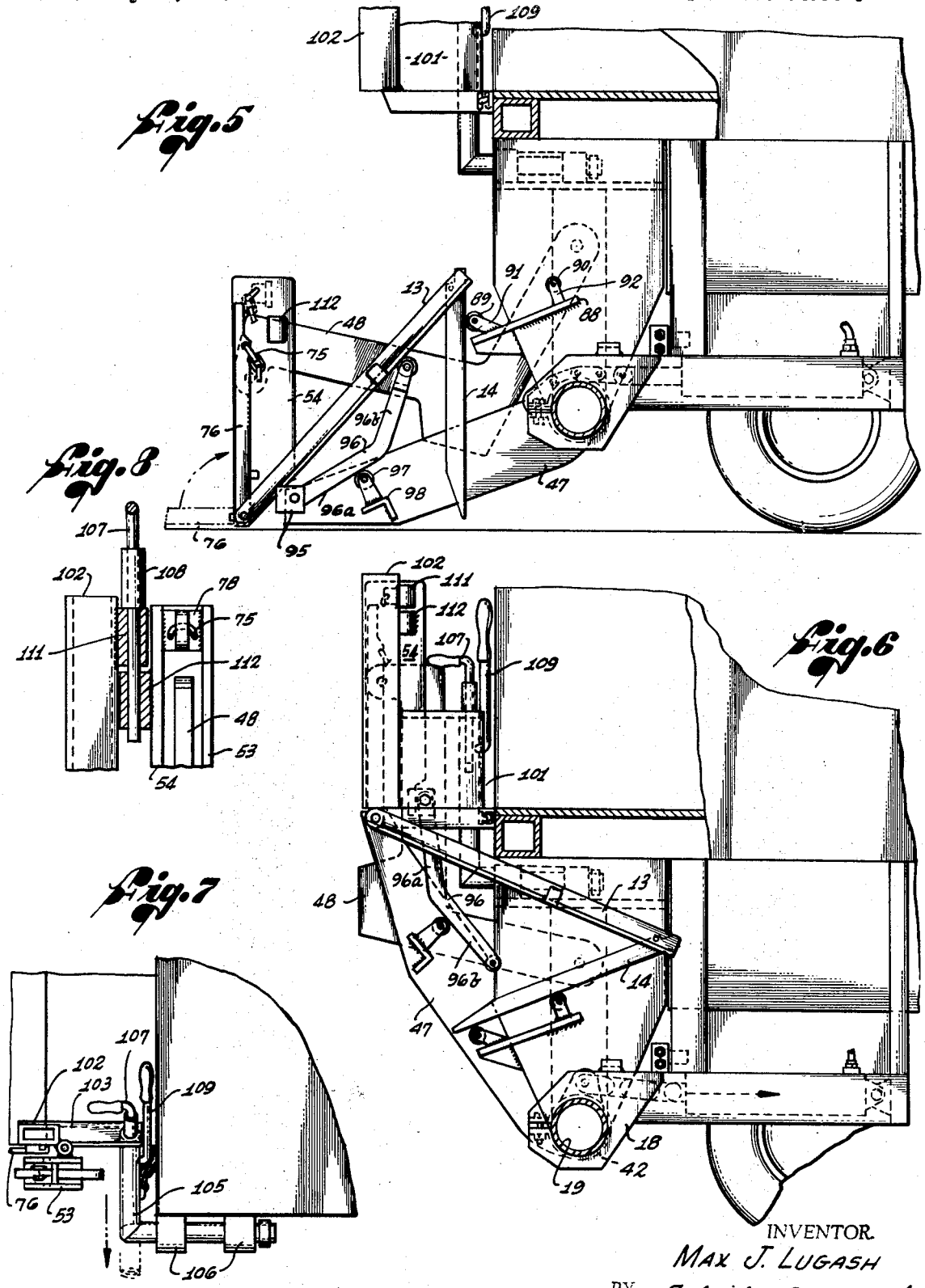

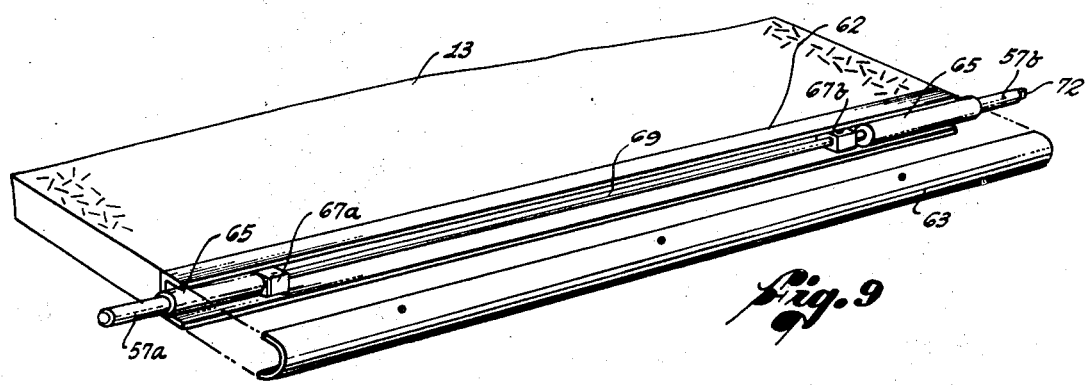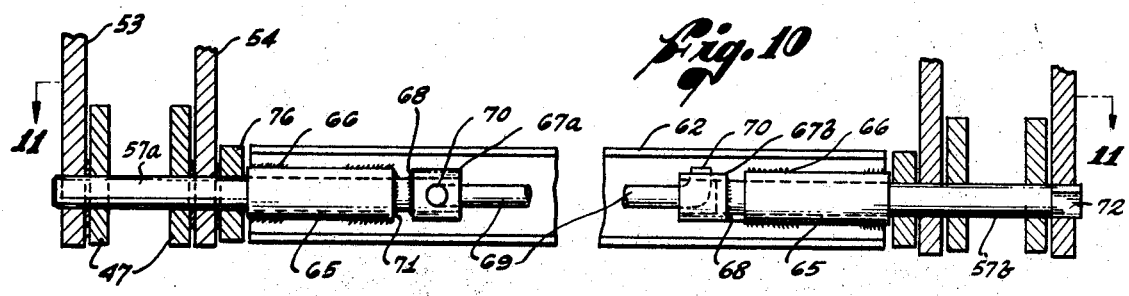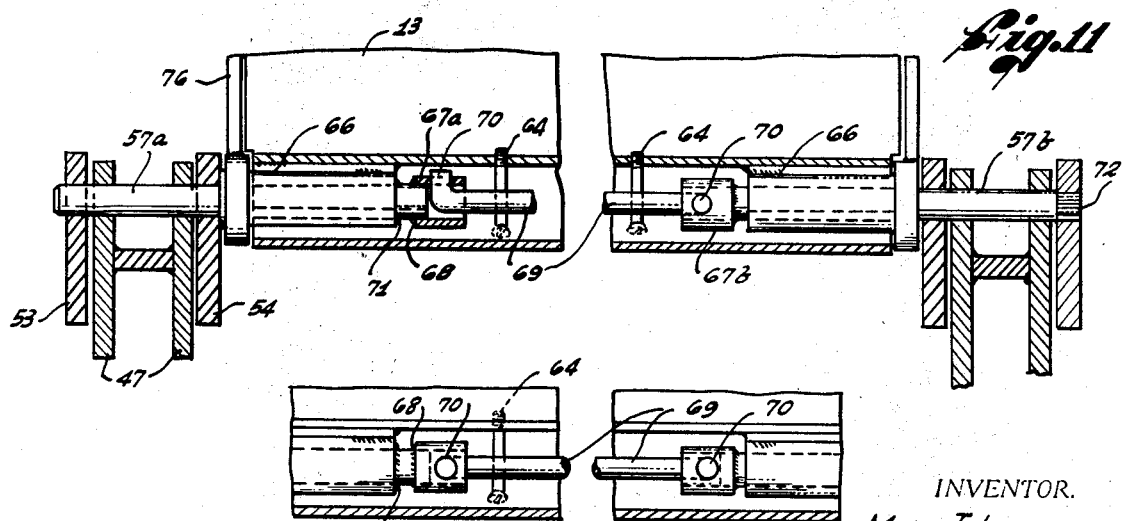

United States Patent Office 3,517,838
Patented June 30, 1970

3,517,838
POWER LOADER FOR VEHICLES WITH TRANSFER PLATE
Max J. Lugash, Los Angeles, Calif., assignor to Maxon Industries, Inc., Los Angeles, Calif.
Filed May 24, 1968, Ser. No. 731,829
Int. Cl. B60p 1/48
U.S. Cl. 214—77                                                          17 Claims

ABSTRACT OF THE DISCLOSURE

A power loader attachment for trucks having a load platform that is made up of a pair of articulated sections and a transfer plate, the latter being alternately connectable to the articulated platform sections or stationarily positionable adjacent the truck bed to comprise an extension of the truck bed with the articulated sections folded over the lifting arms and raised to a concealed position beneath the truck. The supporting framework and lifting arms incorporate camming elements engageable with the articulated sections of the platform for folding and unfolding the platform sections during raising and lowering of the inverted platform sections by the power means. The lifting arms for the load platform comprise a pair of parallelogram linkage systems and the articulated platform sections are hingedly connected thereto at a lower hinge axis so that when the platform is unfolded and extended in the load-bearing position and lowered, it lies directly on the ground and has a low profile. A torsion bar is incorporated in the hinge connection between the articulated platform and the lifting arms for counterbalancing the platform sections during folding and unfolding thereof.

FIELD OF THE INVENTION

The present invention relates to power loaders for trucks and, more particularly, to loaders of this type which can be folded to a concealed position beneath the truck bed.

DESCRIPTION OF THE PRIOR ART

It is known in the prior art to devise a truck loader of the type in which the load platform is foldable with respect to the lifting arms in order to be moved to an out of the way position beneath the bed of the vehicle. Devices of this class are shown in my prior Pats. No. 2,837,227 and No. 2,989,196. As compared to the tailgate platform loader, i.e., that type of loader in which the load platform also serves as a vertically standing tailgate to close the rear end of the truck bed, the foldaway platform type of loader has the advantages of being out of the way for forklift or dock loading, or when not needed for handling heavy or bulky articles of freight. On the other hand, foldaway platform loaders have had the disadvantage, as compared to the tailgate platform loader, of being relatively small in area because of the short depth of the platform, i.e., the front to rear dimension. Because of this limitation, the foldaway platform type of truck loader has not come into use on trucks or other freight vehicles which customarily handled bulky items which require a platform depth approaching the width of the platform. As one example, supermarket freight pallets may require a platform depth of approximately five feet, as do articles of freight which are handled on a pallet jack.

The problem encountered in devising a truck loader of the foldaway platform type with sufficient depth of the platform to handle pallets arises primarily because of the limited clearance afforded between the truck bed and ground level and through which the load platform must be folded or unfolded. Customarily, this clearance will be on the order of perhaps three feet thus permitting a foldaway platform having a depth on the order of, for example, twenty-five to thirty inches. The depth of the foldaway platform may be increased slightly by providing hinged extensions on the rear edge of the main platform section but this has only resulted in increasing the platform depth on the order of ten to fifteen inches, approximately. Thus, in the prior art known to me, it has heretofore not been possible to provide a foldaway platform of sufficient depth to handle loads of great depth, such as five foot pallets, even though this has been the aim of workers in the art as evidenced by the development of hinged extension plates, by myself and others.

SUMMARY OF THE INVENTION

This invention solves the problem of the limitation on the depth of load platforms in truck-loading devices of the foldaway platform type, imposed by the limited clearance between the truck bed and ground level. This apparatus includes what I call a "transfer plate" by virtue of the fact that this plate is transferable between one position in which it is connected to the load platform and another position in which it comprises an extension of the truck bed. The load platform may thus include the transfer plate for use under those conditions in which loads of great depth are to be handled, while for loads of lesser depth the transfer plate may remain level with the truck bed while the load platform then comprises an articulated pair of platform sections, i.e., a main platform section and an extension plate hingedly connected thereto. A spaced pair of parallelogram linkage systems effect raising and lowering of the platform assembly, either with or without the transfer plate, and the main platform section is hingedly interconnected to the lower pivot points of the rear links of these parallelogram linkage systems whereby to take full advantage of such clearance as exists between the truck bed and ground level for increasing the depth of the load platform. The transfer plate, as a rearward extension of the truck bed, also acts as a dock bumper to protect the load platform when in the folded away position. This rearward extension of the truck bed by the transfer plate increases the unobstructed area beneath truck bed level into which the articulated platform sections may be folded and is also a factor in permitting a greater depth dimension of the articulated platform sections. A torsion bar mechanism is incorporated in the hinge connection between the main platform section and the linkage systems to counterbalance the great weight of the main platform section and the hinged extension during folding and unfolding thereof.

DESCRIPTION OF THE DRAWING

The foregoing and other objects or advantages of the invention will be apparent from the following description of the presently preferred embodiment thereof when taken in conjunction with the annexed drawings:

FIG. 3 is a view similar to the phantom outline position of FIG. 2 but with the transfer plate now having been transferred into connection with the hinged platform sections;

FIG. 3a is a sectional view on the line 3a—3a of FIG. 3;

FIG. 3b is a sectional view on the line 3b—3b of FIG. 3;

FIG. 4 is a sectional view on the line 4—4 of FIG. 3 illustrating a power means appropriate for use in the invention;

FIG. 5 is a side elevational view showing the relative position of the parts in a first phase of folding away of the platform sections;

FIG. 6 is a side elevational view showing the relative position of the parts of the apparatus in the folded away position of the platform;

FIG. 7 is a partial plan view taken in the direction of the line 7—7 of FIG. 2;

FIG. 8 is a partial sectional view taken, in part, along the line 8—8 of FIG. 3 and particularly showing the means for interconnecting the transfer plate to the platform assembly;

FIG. 9 is a partial exploded perspective view of the main platform section, the cover at the forward edge of the platform having been displaced to reveal the torsion bar assembly;

FIG. 10 is an elevational view of the front edge of the platform, the cover having been removed, and also showing, in section, the connections of the hinge means to the linkage systems;

FIG. 11 is a sectional view on the line 11—11 of FIG. 10, with the platform in horizontal position; and FIG. 12 is a partial, sectional view similar to FIG. 11 but showing the torsion bar in an upwardly turned position of the platform.

DESCRIPTION OF THE PREFERRED EMBODIMENT

Figure 1:
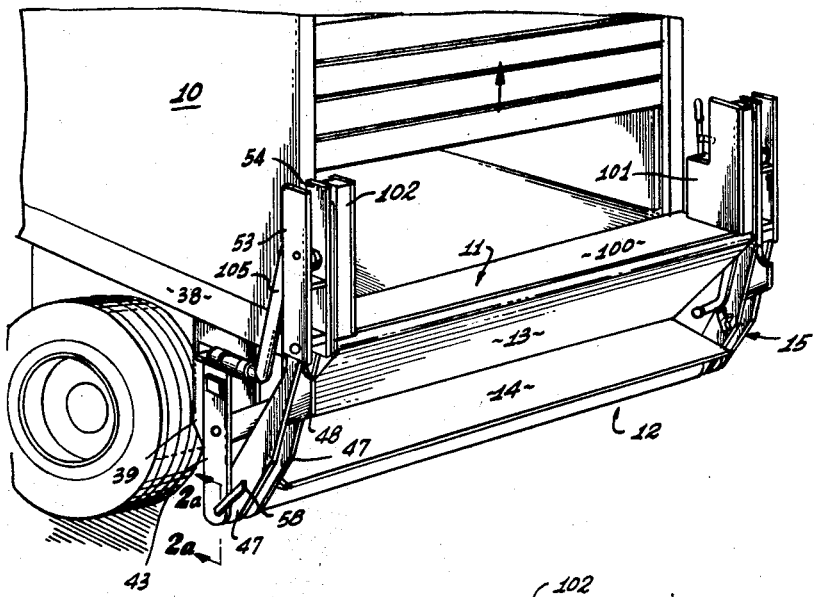
FIG. 1 is a perspective view of the presently preferred embodiment of the invention attached to the rear end of a truck.

FIG. 1 shows the presently preferred embodiment of the loading apparatus connected to the rear end of the van body 10 of a truck. While the van body is shown as being equipped with a vertically slidable door, the invention may be used on van bodies having swinging doors, or on stake bodies. In general, the apparatus comprises a transfer plate assembly and an assembly 12 positioned beneath the bed of the truck and the transfer plate assembly 11. The assembly 12 includes a main platform section 13 and a hinged platform section 14 and a pair of parallelogram linkage systems 15 at opposite sides of the platform by means of which the platform sections are raised and lowered upon actuation of a power means (not shown in this view) drivingly interconnected to the linkage systems.

Preferably, power for raising and lowering the load platform is derived from an electro-hydraulic system, such as is shown in FIG. 4. However, as will be well understood by those skilled in the art, the power may, alternatively, be supplied by means of a power take-off system interconnected to the engine of the truck on which the loader apparatus is mounted. However, the use of an electro-hydraulic system is preferred since it permits making the loader apparatus as an easily mounted self-contained apparatus.

As is shown in FIG. 4, a generally rectangular framework is provided for supporting the power means. This framework may, for example, comprise an opposite pair of parallel side members 16 whose forward ends are rigidly interconnected by a cross member 17. At their rear ends, the side members 16 rigidly support a pair of bearing assemblies 18, which rotatably support an elongated torque tube 19, and these are rigidly interconnected by a strap 20, thereby completing the rigid framework for the support of the power means. As shown in FIG. 3, this framework is rigidly secured in substantially horizontal position to the framework of the truck by means of a plurality of vertically extending rigid struts 21.

Referring again to FIG. 4, the power framework supports a spaced pair of parallel hydraulic cylinders 22 on opposite sides of a hydraulic fluid reservoir 23. This reservoir comprises a portion of a subassembly which integrally mounts or includes a pump 24 and an electrical motor 25. As is well understood, each of the cylinders 22 includes a piston (not shown) that is drivingly connected to a piston rod 26 extending through the rear end of the cylinder. A pair of hydraulic hoses 27 extends from the rear end of each of the cylinders 22 into communication with a T-fitting 28 that communicates with the hydraulic reservoir 23 via the pump 24 and another pair of hydraulic hoses 29 intercommunicate the forward ends of the cylinders 22 with the reservoir 23. With this arrangement, when the motor 25 is energized to drive the pump 24, hydraulic fluid is forced from the reservoir 23 through the T 28 and hoses 27 into the cylinders 22 in order to draw the piston rods 26 into the hydraulic cylinders and this will effect raising of the parallelogram linkage systems and the load platform. When it is desired to lower the platform, a valve (not shown) may be manually opened whereby to bleed fluid from the rear ends of the cylinders 22 back into the reservoir 23 by means of a pair of bypass conduit (not shown). As unitary electro-hydraulic systems and the controls therefor are well known in the art, further description is unnecessary.

Referring to FIG. 3, it will be seen that each of the piston rods 26 is connected to one end of a plurality of links 35 whose other end is drivingly interconnected to a crank arm 36 rigidly secured to the exterior of the torque tube 19. Each of the cylinders 22 at its forward end is pivotally connected, as indicated at 37, to the front member 17 of the supporting framework. By this means, the linear reciprocation of the piston rods 26 is converted into an angular movement of the torque tube 19, the torque tube 19 at opposite ends being drivingly interconnected to the lifting arms of the linkage systems 15.

Figure 2A:
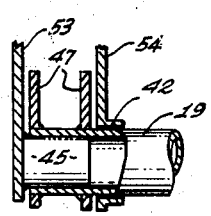
FIG. 2a is a sectional view on the line 2a—2a of FIG. 1.
Figure 2:
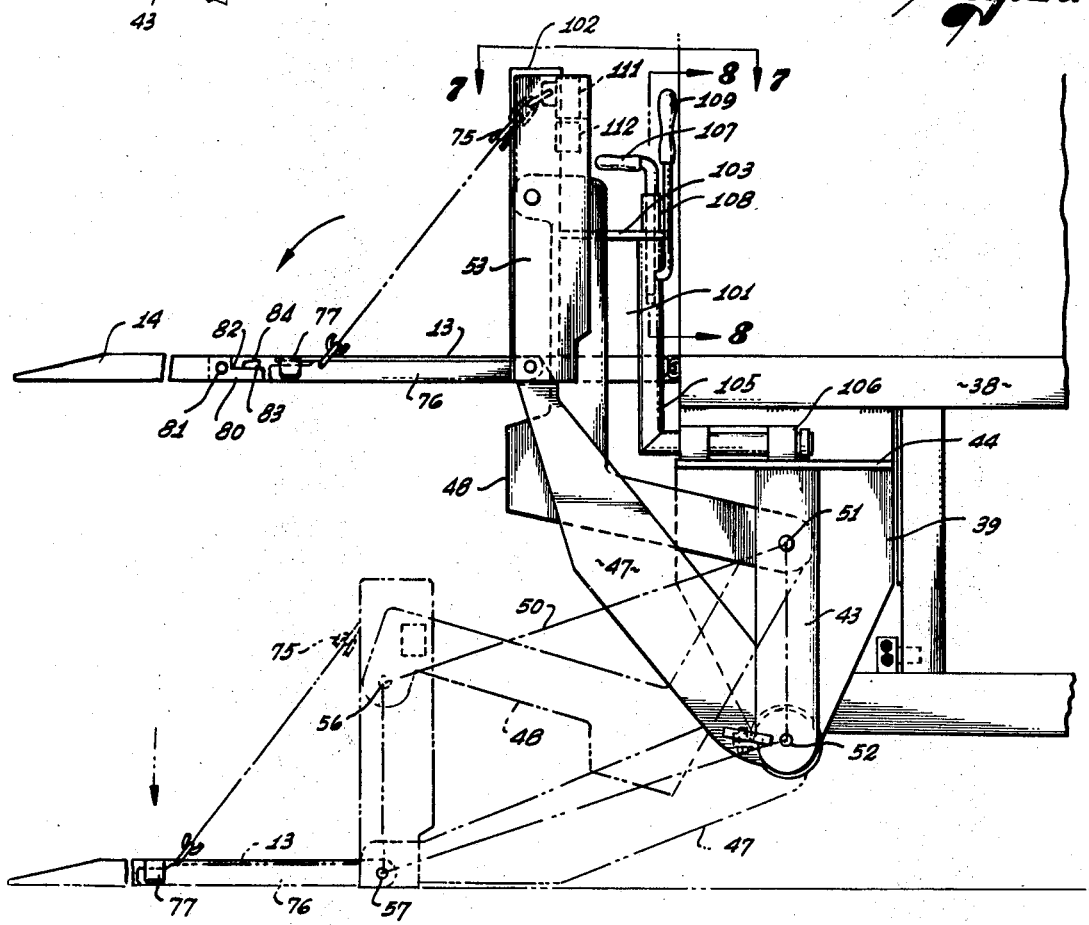
FIG. 2 is a side elevational view showing the hinged platform sections in the extended and raised position flush with the transfer plate and, also, showing, in phantom outline, the extended lowered position of the hinged platform sections prior to being raised to the elevated position shown in solid outline.

Referring to FIG. 2, the truck body includes a pair of opposite side members 38 from which a pair of bracket means are hung at opposite sides of the bed of the truck in order to support opposite ends of the torque tube 19. Each of these bracket assemblies includes a plate 39 whose upper edge is fastened, as by welding 40, to the lower side of a member 38. The lower end of each plate 39 develops into a triangularly-shaped, downwardly-pointing portion 41 in whose apex there is secured a bearing means 42 to journal one end portion of the torque tube 19. Outwardly spaced from each plate 39 but in parallel relation thereto is a vertically disposed hanger member 43 whose lower end on its inner face rigidly supports a bearing to telescopically rotatably seat the corresponding end of the torque tube 19. The upper end of this hanger strap 43 is rigidly secured to a horizontally-disposed shelf member 44 that protrudes outwardly from the plate 39, being rigidly affixed as by welding to the plate 39.

Each of the parallelogram linkage systems 15 includes a lower pair of lifting arms 47 and an upper lazy arm 48. As can be seen from FIG. 1, these arms are arranged in such a fashion that the upper lazy arm 48 is disposed between the spaced-apart lower pair of lifting arms 47. As is indicated by the dotted line parallelogram 50 in FIG. 2, the hinge points of the pivotal connections of forward and rear ends of the upper and lower arms define a parallelogram in order that the platform sections 13 and 14 remain substantially level during raising and lowering thereof. As will be apparent to those skilled in the art, if a ramping action, rather than a level-loading action, of the platform is desired, one or the other of the vertical links of the system may be shortened in order to effect a tilting action of the platform.

Each of the upper arms 48 is connected at its forward end to a hinge pin 51 that is interconnected to and spans the space between the hanger strap 43 and the adjacent plate 39. In each linkage system, each of the pair of lower lifting arms 47 at its forward end is rigidly connected as by welding, for example, to the area of the torque tube 19 disposed between the strap 43 and plate 39 so that the lower lifting arms turn about the axis 52 of the torque tube 19.

The forward link of each parallelogram linkage system 15 comprises a spaced pair of vertically disposed members 53 and 54 between which rear ends of the upper lazy arm 48 and lower pair of lifting arms 47 are disposed. As is indicated in FIG. 1, the members 53 and 54 may be braced by a vertically spaced pair of plates 55. An upper hinge pin 56 is mounted between the pair of members 53 and 54 to pivotally mount the rear end of the upper lazy arm 48. Similarly, hinge pins 57a and 57b are affixed to the forward edge of the main platform section 13, to extend between the members 53 and 54 to define the lower hinge axis of the rear link of the linkage system 50. At the forward end of the outermost one of the lower pair of lifting arms 47 a strap 58 is rigidly secured thereto, the strap being formed with an offset, whereby the free end of the strap bears against the outer surface of the corresponding hanger strap 43 thereby to hold the lower end of the strap and the bearing on the inner face thereof into secure engagement with the corresponding end of the torque tube 19.

The platform sections 13 and 14 are of rectangular plan configuration of an internal construction which is well known in the art and, therefore, need not be described in detail. The platform 13, for example, includes a top skin 60 rigidly secured on top of a rigid framework which includes at least a rectangular rigid framework made up of channel members 61, as indicated in FIG. 3b. As is shown in FIGS. 5 and 6, the two platform sections are so related that the section 14 is foldable over the section 13, the two sections then being foldable together forwardly around the hinge pins 57 and forwardly towards the linkage systems. As the platform sections are quite heavy, a counterbalancing torsion spring means is incorporated in the hinge axis defined by the pair of hinge pins 57.

Referring to FIG. 9, the platform 13 has a channel 62 affixed along the forward edge of the platform in order to define a housing for the torsion spring means, this housing normally being closed by an elongated cap member 63 that is substantially half-round in cross-sectional configuration. As is indicated in FIG. 11, the cap member 63 is normally rigidly held in place by a plurality of appropriate fasteners 64 which interconnect the cap member to the web portion of the member 62.

FIG. 10 is a view looking into the member 62 with the cap member 63 removed, from which it can be seen that a pair of coaxially aligned sleeves 65 are rigidly secured, as by welding 66, to the web portion of the member 62 to receive the hinge pins 57a and 57b, both of which extend inwardly through their corresponding sleeve 65. The pins 57a and 57b at their innermost ends coaxially rigidly mount a tubular coupling 67a and 67b, respectively, the coupling being secured thereto as, for example, by welding 68. Each of these couplings is formed with an opening in its sidewall in order to receive one end of a torsion bar 69, as indicated in FIG. 11. Thus, the torsion bar is formed at its opposite ends with a hook portion 70 which extends through the sidewall opening in the corresponding coupling 67a or 67b.

The hinge pin 57a is rigidly fastened to its sleeve 65, as indicated by the welding 71. Accordingly, upon turning of the platform 13 about the hinge axis, the hinge pin 57a is also turned thereby inducing rotation of its associated coupling 57a and turning of the corresponding end of the torsion bar 69. The other hinge pin 57b, however, is free to rotate relative to its sleeve 65 but at its outer end is formed with a non-circular section 72 that is keyed into a similarly shaped non-circular hole formed in the lower end of the member 53. Accordingly, the hinge pin 57b is held against turning upon movement of the platform 13 whereby its associated coupling 67b is held against rotation to restrain the corresponding end of the torsion bar 69 against rotation. Thus, FIG. 12 illustrates the relative position of the opposite ends 70 of the torsion bar 69 when the platform is in an upright position having been turned upwardly from the ground-engaging horizontal position of the platform indicated in FIG. 11.

The torsion bar 69 is torsionally unstressed when the platform 13 is in the vertically-extending position of FIG. 12, both ends 70 then being in the same plane and pointing in the same direction. Accordingly, lowering of the platform about the hinge pins 57a to the horizontally-extended position of FIGS. 10 and 11 stresses the bar 69 which counterbalances the weight of the platform for both lifting and lowering of the platform sections 13 and 14.

In order to support the platform sections 13 and 14 in the open, horizontally extended load-receiving position, a chain 75 and support bar 76 may be employed at opposite sides of the platform, as indicated in FIG. 2. Thus, a downwardly opening bracket 77 is secured to each of the opposite sides of the platform section 13 just forwardly of the rear edge of the platform section to receive the rear end of one of the support bars 76. The forward end of each support bar 76 is pivotally connected to one of the hinge pins 57a or 57b at a location just inside the inner upright member 54. The chain 75 is connected at one end to the rear end of one of the support bars 76 and has its other, upper end secured between the upper ends of the corresponding pair of uprights 53 and 54 to a suitable bracket 78, which also serves as a brace rigidly interconnecting the upper ends of these two uprights.

The platform section 14 is hingedly connected to the platform section 13 in the manner shown in FIG. 2. Thus, each of the opposite sides of the platform section 14 is formed with a rearward extension 80, extending forwardly of the forward edge of the upper surface of the platform section 14 to mount a hinge pin 81 hingedly interconnecting the two platform sections. An upper edge of each forward extension 80 is relieved by the formation of a notch, as indicated at 82, to define an upwardly-facing shoulder which abuts a stop member 83 that is rigidly secured to the corresponding side of the platform section 13. As will be apparent, the hinge pins 81 are so related to the stop members 83 that when the platform section 14 is unfolded it comprises a coplanar horizontal extension of the main platform section 13 while permitting upward folding movement of the platform section 14 relative to the section 13.

The folding and unfolding of the platform sections 13 and 14 are partially a manual operation and partially automatic in operation. Thus, assuming the two platform sections 13 and 14 to be in the horizontally-extended and lowered position indicated in phantom outline in FIG. 2, the rear edge of the section 14 is first grasped to lift that section about its hinge axis at the pins 81 to turn it over the main platform section 13. In this connection, the pair of stop members 83 are formed with inclined upper faces that include an angle of approximately 135° with respect to the horizontal position of the platform section 14, thus limiting forward folding movement of the platform section 14 to that extent.

Next, the rear edge of the main platform section can be grasped to manually rotate it about the hinge pins 57a and 57b, the two platform sections 13 and 14 thus being manually turned forwardly overcenter of the hinge pins 57 to the position shown in FIG. 5. Then, each of the support members 76 is manually turned upwardly about the hinge pins 57 to the erect position indicated in solid outline in FIG. 5. A stop member 86 is rigidly secured to the inside of each upright plate 54 to serve as an abutment against which the support arm 76 comes to rest.

While the folding operation so far has been manual, subsequent folding movement of the platform sections 13 and 14 to the stowed away positions is effected automatically upon actuation of the power means to raise the linkage systems. Thus, each of the plates 39 at opposite sides of the truck has an inclined member 88 secured to its inner face and each of the members 88 has a pair of cam rollers 89 and 90 mounted on the upper face thereof by suitable bracket means 91 and 92, respectively. It will be noted that the rear cam roller 89 projects slightly rearwardly of a vertical plane that includes the rear edge of the member 88 and so serves as an abutment against which the platform section 14 abuts.

Each of the upright members 54 has a bracket 95 secured to the lower end thereof on its inner face to which one end of a cam follower arm 96 is pivotally connected. This follower arm has two angularly related edges 96a and 96b which are adapted to ride on a cam roller 97 which is mounted in a bracket 98 that is secured to the inner face of the inner one of the pair of lifting arms 47 of each linkage system, the bracket being located adjacent the rear end of the lifting arm. As is shown in FIG. 5, the angular relation between the edges 96a and 96b of the arm 96 is such that when the cam roller 97 rides on the edge 96a, a cam roller 99 mounted at the free end of the arm 96 rides along the confronting surface of skin 60 of the main platform section 13.

Assuming that the platform sections 13 and 14 are in the positions indicated in FIG. 5, actuation of the power means to elevate the linkage systems effects camming of the platform sections to the elevated positions indicated in FIG. 6. Thus, as the linkage systems are raised the platform section 14 simultaneously rolls on the pair of cam rollers 89 and turns about that roller in a clockwise direction, as viewed in the figures, until it comes into rolling contact with the roller 90, as shown in FIG. 6. Simultaneously, the cam roller 97 rolls forwardly along the edge 96a of the arm 96 and onto the edge 96b at which time the arm 96 moves away from the main platform section 13.

The cam follower 96 is primarily effective in accomplishing partial automatic unfolding of the platform section 13. Thus, assuming the parts to be in the relative position shown in FIG. 6, as the linkage systems are lowered the cam roller 99 rolls rearwardly along the edge 96b and onto the edge 96a at which time the arm 96 is pivoted toward the main platform section 13 until the roller 99 engages the skin 60. Continued lowering movement of the linkage systems effects further pivotal movement of the arm 96 in order to swing the platform 13 in the unfolding direction. Simultaneously, the platform section 14 rolls rearwardly and around the cam roller 89. Thus, when the linkage systems have been fully lowered, the platform sections 13 and 14 are in the relative positions indicated in FIG. 5 whereby the rear upper edge of the main platform section 13 is more readily accessible without having to reach too far under the bed of the truck or under the transfer plate assembly 11.

The transfer plate assembly includes a top skin 100 of elongated, rectangular plan configuration. At the opposite ends of the top skin 100, an upstanding pair of rigid plates 101 are rigidly secured, each being mounted adjacent a tubular post 102 rigidly secured to a rear corner of the plate 100. As is shown in FIG. 2, the upper edge of each plate 101 is turned outwardly into a flange 103 which extends between the corresponding post 102 and the forward vertical edge of the plate 101 in the plane of the forward edge of the skin 100.

In order to support the transfer plate assembly1 11 at the level of the truck bed, a pair of L-shaped tubular support members are provided at opposite ends of the transfer plate assembly. As is shown in FIG. 2, the shelf 44 of each mounting bracket plate 39 mounts a bearing means 106 to pivotally receive a horizontal leg of a support member 105, although the support members could be mounted to the track instead of to the same framework as supports the platforms. The vertical leg of the support member projects rearwardly beyond the vertical plane of the end of the truck bed with its upper end in abutment with the underside of the flange 103 of the corresponding plate 101 and with the open upper end of the vertical leg in registration with a hole formed through this flange. A latching rod 107 is insertable through this perforation and into the upper end of the vertical leg of the support member 105 to lock the support member in place. A sleeve or collar 108 is secured to the stem of the latching member 107 in order to limit insertion of the latching rod to a predetermined extent. Adjacent the upper end of the vertical leg of the support member 105, a handle member 109 is secured so that when the latching member 107 is removed the support member 105 can be turned inwardly and outwardly with respect to the plate 101. A short chain 110 may be connected to a lower portion of the vertical leg of the support member 105 and to a convenient portion of the truck bed in order to limit the permissible outward movement of the support member, as is shown in FIG. 3a.

As is shown in FIG. 8, a sleeve 111 is rigidly affixed, as by welding, to the outwardly facing side of each corner post 102 of the transfer plate assembly 11 while each of the upright members 54 has a similar sleeve 112 welded or otherwise secured to the inner face thereof. The sleeves 111 and 112 are so related that when the linkage systems are in the fully elevated position whereby the uprights 54 are positioned adjacent the outwardly facing sides of the corner posts 102, the sleeves 111 and 112 are coaxially vertically aligned. Then, the pair of latch handles 107 may be removed from the support members 105 and inserted through the coaxially aligned sleeves 111 and 112. Then, the support members 105 may be swung outwardly from under the flanges 103 whereby the transfer plate assembly 11 is now interconnected to the uprights 54.

It will be observed from FIG. 5 that the top skin 100 of the transfer plate assembly 11 projects rearwardly beyond its supporting framework. This rearwardly projecting edge of the skin 100 and the posts 102 can thus bear on top of the forward edge cap 63 of the platform 13 so that the transfer plate assembly 11 can be carried by the forward edge of the platform. This projecting rear edge of the skin 100 also provides clearance to receive the edge of the platform section 13 when inverted, as indicated in FIG. 6.

The manner of use of the apparatus is as follows.

The traveling position of the load apparatus is illustrated in FIG. 1. In this condition, the transfer plate assembly 11 is fully supported by the pair of support members 105 and the platform sections 13 and 14 are stowed beneath the rear end of the truck bed and beneath the transfer plate assembly. In this condition, the truck on which the apparatus is mounted may be backed up directly against a dock for loading or unloading. In this connection, as the rear edge of the transfer plate assembly 11 is supported by the raised linkage systems, while the forward edge of the transfer plate is supported by the support members 105, fork-lift trucks and other heavy equipment may be rolled across the transfer plate without damage to the apparatus.

To bring the platform sections 13 and 14 into use, the linkage systems 15 are lowered into engagement with the ground. This automatically effects a partial unfolding action of the platform sections 13 and 14 in the manner previously described and as illustrated in FIGS. 5 and 6. Then, the platform sections 13 and 14 may be further unfolded manually to the horizontally extended position shown in phantom outline at FIG. 2. Now, if the cargo to be loaded or unloaded is not too large for the area of the platforms 13 and 14, these platforms may be used for raising and lowering the load while the transfer plate assembly 11 remains stationarily fixed at the level of the truck bed.

If the depth of the platforms 13 and 14 is insufficient to handle a load, the platforms 13 and 14 are first elevated to the solid outline position of FIG. 2, to the level of the transfer plate assembly 11 and the truck bed. Then, the latching handles 107 are withdrawn from engagement with the support members 105 and inserted through the aligned sleeves 111 and 112 in order to lock the transfer plate assembly into flush engagement with the platforms 13 and 14. Then, after the support members 105 have been swung out of the way, the transfer plate assembly 11 may be raised and lowered as needed along with the platform sections 13 and 14. Thus, as is indicated in FIG. 3, it may be lowered into engagement with the ground along with the sections 13 and 14. When the loading or unloading operation has been completed, the linkage systems 15 are once again fully raised to bring the transfer plate assembly 11 against the rear end of the truck bed. Then the support members 105 are swung inwardly under the flanges 103 after which the latching handles 107 are removed from the sleeves 111 and 112 and reinserted into locking position into the support members 105. Thereafter, the platform sections 13 and 14 are lowered to ground level after which the platform sections are folded to the stowed position, manually and automatically, in the manner previously described.

While in the foregoing specification there has been disclosed a presently preferred embodiment of the invention, it is not to be inferred therefrom that the invention is limited to the exact details thereof, which have been described by way of example, and it will be understood that the invention embraces all such changes and modifications in the parts, and in the construction, combination and arrangement of parts, as shall come within the purview of the appended claims.

I claim:
1. In a loader apparatus, the combination comprising:
a supporting framework;
a spaced pair of lifting arm means, each having one end pivotally connected to said supporting framework to extend rearwardly therefrom and each comprising an upper arm and a lower arm and a rear link to which said arms are pivotally interconnected at vertically spaced-apart hinges;
a transfer plate assembly;
a pair of support means at opposite sides of said framework for detachably connecting said transfer plate assembly to said supporting framework, said pair of support means being adapted and arranged to support said transfer plate assembly on said framework in a stationary level position extending horizontally rearwardly from said supporting framework;
said lifting arm means being pivotable about an axis so disposed that said rear links of said lifting arm means can be raised into proximity to a rear edge of said transfer plate assembly;
and a pair of latching means for detachably interconnecting said transfer plate assembly and said rear links of said lifting arm means when said lifting arm means are raised whereby said transfer plate assembly can be raised and lowered by said lifting arm means after said transfer plate assembly has been detached from said pair of support means.
2. An apparatus as in claim 1 in which:
said pair of latching means is adapted and arranged to detachably interconnect said transfer plate assembly to said rear links of said lifting arm means to support said transfer plate assembly at substantially the level of the lower ones of said hinges of said rear links.
3. Apparatus as in claim 1 in which:
said support means comprises a spaced pair of support members mounted on said supporting framework and adapted to be shifted into and out of positions in which said support members project beneath portions of said transfer plate assembly.
4. Apparatus as in claim 3 in which:
said support members are vertically-extending members having lower ends pivotally connected to said supporting framework at points outwardly adjacent to opposite ends of said transfer plate assembly;
the upper ends of said vertically-extending members being swingable into and out of engagement with downwardly-facing portions of the opposite ends of said transfer plate assembly.
5. Apparatus as in claim 1 in which:
said transfer plate assembly rigidly mounts a pair of upright members positioned and arranged for confronting relationship to the pair of said rear links when said lifting arms means are in the raised position;
and said latching means includes cooperating portions of said links and said upright members that are brought into alignment with one another upon said upright members and links being positioned in said confronting relationship.
6. Apparatus as in claim 5 in which:
said cooperating portions of said links and said upright members comprise vertically-extending sleeves that are adapted to receive a latching rod upon said sleeves being brought into coaxial alignment.
7. Apparatus as in claim 1 in which:
said support means for detachably connecting said transfer plate assembly to said framework includes a spaced pair of support members mounted on said supporting framework and adapted to be shifted into and out of positions in which said support members project beneath portions of said transfer plate assembly, said support members having projecting hollow ends swingable into and out of registration with openings formed in portions of said transfer plate assembly;
said latching means comprising cooperating portions of said lifting arm means and said transfer plate assembly in which portion openings are formed, said openings being brought into registration upon raising of rear end portions of said lifting arm means into proximity to said transfer plate assembly;
and a pair of latching rods, each of which is alternatively engageable with said openings of said latching means or said openings and hollow ends of said support means when rear end portions of said lifting arm means have been raised into proximity to said transfer plate assembly.
8. In a loader apparatus, the combination comprising:
a supporting framework;
a spaced pair of lifting arm means having forward ends pivotally interconnected to said supporting framework;
a main platform having a forward edge interconnected to rear ends of said lifting arm means so as to be vertically movable by said lifting arm means between lowered and raised positions;
a rectangular plate;
a spaced pair of plate support means mounted on said supporting framework to be shiftable into and out of contact with said plate and adapted to support said plate higher than said lifting arm means when in contact with said plate;
said lifting arm means being pivotable about an axis so disposed to bring a forward edge of said platform adjacent to a rear edge of said plate when said platform is elevated to said raised position by said lifting arm means;
and a pair of latching means, each comprising cooperating portions of said plate and said platform adjacent the forward edge of said platform and rear edge of said plate, said latching means being adapted to selectively interconnect said plate to said platform whereby said plate can be raised and lowered along with said platform after said support means have been shifted out of contact with said plate.

9. An apparatus as in claim 8 in which:

said platform is pivotally interconnected along its forward edge to said lifting arm means along a pivot axis so located that said platform is invertable from an open position extending rearwardly from said lifting arm means to a folded position in which platform extends forwardly from said pivot axis, said lifting arm means and said folded platform being adapted for raising said folded platform to a stowed position beneath said plate.

10. An apparatus as in claim 9 in which:

an extension platform is provided at the rear of said main platform;

said two platforms being interconnected by a hinge means so located that said extension platform is foldable forwardly over said main platform, said two platforms then being foldable forwardly about said pivot axis toward folded positions beneath said plate to be subsequently elevated to a stowed position beneath said plate by raising of said lifting arm means.

11. An apparatus as in claim 9 in which:

a camming means is interconnected between said lifting arm means and said folded platform that is adapted and arranged to translate lowering movement of said lifting arm means into unfolding movement of said folded platform.

12. An apparatus as in claim 10 in which:

a camming means is interconnected between said supporting framework and said folded extension platform that is adapted and arranged to translate raising and lowering of said lifting arm means into forwardly turning and rearwardly turning movements, respectively, of said extension platform.

13. An apparatus as in claim 8 in which:

said lifting arm means each comprises an upper arm and a lower arm and a rear link to which the rear ends of said upper and lower arms are pivotally connected at vertically spaced-apart hinges, said main platform being connected to said lifting arm means at the level of the lower hinges of said rear links.

14. An apparatus as in claim 13 in which:

said rectangular plate rigidly mounts a pair of upright members positioned and arranged for confronting relationship to the pair of said rear links when said lifting arm means are in the raised position;

and said latching means includes cooperating portions of said links and said upright members that are brought into alignment with one another upon said upright members and links being positioned in said confronting relationship.

15. Apparatus as in claim 14 in which:

said cooperating portions of said links and said upright members comprise vertically-extending sleeves that are adapted to receive a latching rod upon said sleeves being brought into coaxial alignment.

16. Apparatus as in claim 13 in which:

said support means includes a pair of support members having projecting hollow ends swingable into and out of registration with openings formed in portions of said plate;

said latching means comprising cooperating portions of said lifting arm means and said plate in which portion openings are formed, said openings being brought into registration upon raising of rear end portions of said lifting arm means into proximity to said plate;

and a pair of latching rods, each of which is alternatively engageable with said openings of said latching means or said openings and hollow ends of said support means.

17. Apparatus as in claim 13 that includes:

a spaced pair of bracket means to which forward ends of said upper and lower arms of said pair of lifting arm means are pivotally interconnected;

said plate support means each comprising a vertically-extending tubular member that is pivotally connected at a lower end to one of said bracket means, said plate being formed at each end with a horizontally disposed flange beneath which the upper end of one of said tubular support members is receiveable to support said plate thereon.

References Cited

UNITED STATES PATENTS

| | | | |
|---|---|---|---|
| 2,033,243 | 3/1936 | Jester | 214—77 |
| 2,761,572 | 9/1956 | Baker. | |
| 2,856,081 | 10/1958 | Zaha. | |
| 2,889,059 | 6/1959 | Selzer. | |
| 2,899,089 | 8/1959 | Ajero. | |
| 3,184,082 | 5/1965 | Hall | 214—77 |

FOREIGN PATENTS

| | | |
|---|---|---|
| 1,108,252 | 8/1955 | France. |
| 179,909 | 1/1923 | Great Britain. |

GERALD M. FORLENZA, Primary Examiner

R. J. SPAR, Assistant Examiner

U.S. Cl. X.R.

214—130

UNITED STATES PATENT OFFICE
CERTIFICATE OF CORRECTION

Patent No. 3,517,838          Dated  June 30, 1970

Inventor(s)  Max J. Lugash

It is certified that error appears in the above-identified patent and that said Letters Patent are hereby corrected as shown below:

Column 3, line 69, delete complete line. Column 6, line 12, after "57a" insert -- and 57b --. Column 7, line 66, after "assembly" and before "11" delete "1". Column 10, line 13, change "arms" to -- arm --. Column 11, line 6, after "which" insert -- said --.

Signed and sealed this 31st day of August 1971.

(SEAL)
Attest:

EDWARD M. FLETCHER, JR.           ROBERT GOTTSCHALK
Attesting Officer                 Acting Commissioner of Patents